July 17, 1951 F. PISCHEK ET AL 2,561,224

LOCKING ARRANGEMENT FOR SCREWS

Filed July 28, 1947

INVENTORS
Friedrich Pischek
Eduardo N. Nagle
Arturo Z. P. Anchorena.

BY *Emory L. Groff*
ATTORNEY

Patented July 17, 1951

2,561,224

UNITED STATES PATENT OFFICE 2,561,224

LOCKING ARRANGEMENT FOR SCREWS

Friedrich Pischek, Eduardo Nicandro Nagle, and Arturo Zacarías Paz Anchorena, Florida, Argentina; said Nagle assignor to said Pischek Application July 28, 1947, Serial No. 764,192
In Argentina November 15, 1946

4 Claims. (Cl. 151—53)

The present invention refers to a locking element for hexagonal nuts and screws.

Nuts and screws are well known mechanical elements employed for uniting two or more parts which, in turn, usually form part of a machine. In order to retain the initial joining pressure, it is absolutely necessary to keep the nut and screw from moving. This locking of the screw-joint against stresses taking place when the joint is working, particularly in the case of vibrations, is obtained by means of a number of devices for preventing the loosening of said joint.

There is a very great variety of known locking means applicable to screws and nuts. Among the more efficient and popular types we have the slotted castle nut. Its use requires, besides, a key or wedge, or a boring through the screw. Two problems, one economic and one technical, are connected with the use of this nut. The economic problem resides in the fact that it is necessary to manufacture special high-priced nuts, as well as to perforate the screw. The technical problem resides in the circumstance that the surface of the nut is in itself a limitation on the possible number of slots or notches. With this type of nut, having from six to twelve slots, a sixty or thirty-degree turn causes such an increase in the tension that danger exists of stretching the screw or shearing the thread.

The object of the present invention is to eliminate these difficulties by means of a locking arrangement applicable to normal nuts and screws, and permitting to fix the nut in practically any position.

The invention consists of a rotatable plate cut hexagonally in the same manner as the hexagon of the nut, provided with notches and a washer, which latter element is provided with tongues and an opening for the passage of the screw.

Figure 1:
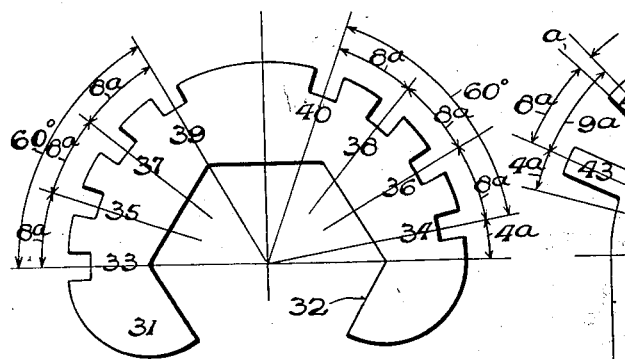

The invention has been shown in the attached drawing, in which:

Figure 1 is a plan view of the rotatable plate 31, hexagonally cut as in 32, and provided with notches 33, 34, 35, 36, 37, 38, 39 and 40.

Figure 2:
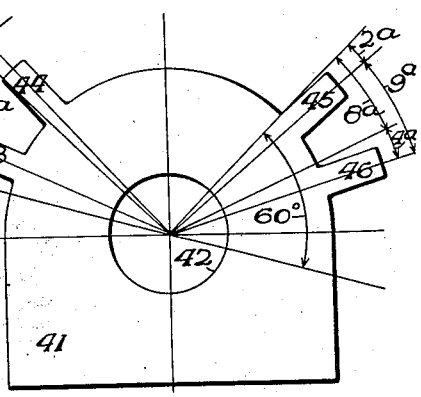

Figure 2 is a plan view of washer 41, with opening 42 and tongues 43, 44, 45 and 46.

Figure 3:
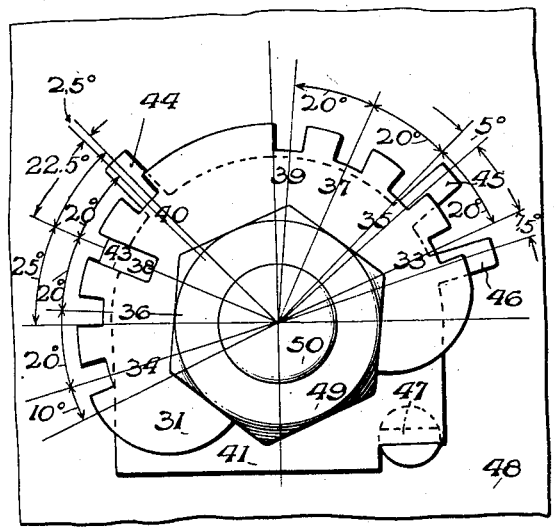

Figure 3 is a plan view of the locking assembly, together with rotatable plate 31, washer 41 anchored at 47 to part 48, nut 49 and screw 50.

Figure 4:
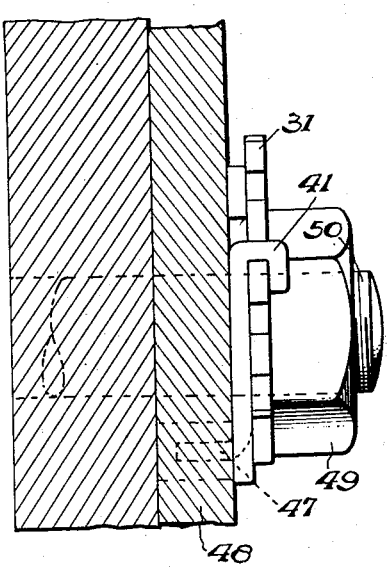

Figure 4 is a sectional view of the locking assembly.

Following are described the component parts of the invention, as well as their respective applications.

Rotatable plate 31, shown in Figure 1, is provided with a hexagonal cutting 32, of the same proportions as the hexagon of the nut to be secured, and two notched segments. The number of notches may vary, increasing or diminishing in accordance with the number of fixing points required for a complete turn of the nut. When a hexagonal, equilateral nut effects a sixty-degree clockwise turn, one side of the nut occupies the position previously occupied by the preceding side, in the direction of the movement. Consequently, the number of notches per sixty-degree section is the factor which determines the total quality of fixing points for an entire 360-degree rotation.

For example, a segment is formed by four notches 33, 35, 37 and 39 spread over equal angles of 8 alpha each over sixty-degrees, the other segment with its notches 34, 36, 38 and 40 being also equally divided. Each segment suffers a sixty-degree displacement, less one half of the angle between two notches, or four alpha, with regard to the other segment. On withdrawing the plate and replacing it in an inverted fashion with regard to the vertical axis, segment 33, 35, 37 and 39 occupies the position formerly taken by segment 34, 36, 38 and 40, each notch having been displaced through a four-alpha angle. In this manner, rotatable plate 31, with eight notches, produces 12 divisions of four alpha each over a 120-degree angle.

Washer 41, shown in Figure 2, is provided with an opening for the passage of the screw, as well as with a number of tongues. This washer is placed between the part to be screwed and the nut, it being necessary to fix same to said part. This fixation may be accomplished by several means, such as bending the washer over an edge of the part, resting same against a projection, by means of a lug or tooth anchored in a boring expressly made for the purpose, or using the washer for two or more simultaneously. The tongues provide a means for fixing the rotatable plate 31 (see Figure 1) in position, by bending said tongue over and through the notch cut in the plate mentioned.

For example, the washer shown in Figure 2, carries four tongues 43, 44, 45 and 46, two tongues corresponding to each notched segment of the rotatable plate 31.

Based on the principle of the vernier, the tongues are arranged in such a manner that, with regard to the rotatable plate 31, they divide the 4-alpha angles of the resulting divisions through the eight notches of rotatable plate 31, in four angles of one alpha each. When tongue 43 of Figure 2 coincides with notch 35 of Figure 1, tongue 44 should be separated from notch 37 through one alpha, tongue 45 from notch 38 through two alphas, and tongue 46 from notch 36 through three alphas.

Designating as "m" the possible total of coinciding points between a number of notches provided on the rotatable plate and the four tongues of the washer; as "alpha" the angle which is equivalent to one eighth of the angle between two notches of one segment of the rotatable plate; as "b" the number of alpha angles between two tongues of the washer; and as "d" the number of notches provided in the rotatable plate, a sixty-degree rotation of the nut gives the following result:

$$m = (b-1) + 2(2d - (b-1))$$

and $$\text{Alpha} = \frac{60}{m}$$

Taking, as an example, a separation of nine alpha between the tongues, and eight notches for "d," we arrive at:

$$m = (b-1) + 2(2 \times 8 - (9-1)) = 24 \text{ points}$$

for fixing the nut through a sixty-degree turn, or 144 for a 360-degree turn, each locking point corresponding to a displacement of 2.5 degrees. As the number of tongues, the angle between same and the number of notches are variable factors, the combinations theoretically possible are unlimited.

Figure 3 shows an assembly of a nut secured in accordance with the invention, the rotatable plate 31 being provided with eight notches and washer 41 with four tongues. This washer is fixed to part 48 through an anchorage at 47. Nut 49 is secured by means of tongue 43, of washer 41, through notch 38 of rotatable plate 31. Should notch 38 not coincide with tongue 43, a clockwise turn of nut 49 through less than 2.5 degrees, would cause said notch 40 to coincide with tongue 44; another 2.5-degree displacement, would cause notch 35 to become aligned with tongue 45, and a further 2.5-degree movement would enable tongue 46 to lock the nut through notch 33. The rotatable plate being now withdrawn and replaced in a reversed manner, being turned over the vertical axis of the nut, tongue 43 is positioned at 2.5 degrees distance from notch 35, tongue 44 at 5 degrees from notch 37, and tongue 45 at 7.5 degrees from notch 38, and tongue 46 at 10 degrees from notch 36. When this position is arrived at, rotatable plate 31 is again reversed. In this fashion, the nut can be locked in twenty-four positions through a sixty-degree turn, i. e., at every 2.5 degrees of rotation.

Figure 4 illustrates a cut through the locking assembly, showing the parts screwed together, screw 50, nut 49, rotatable plate 31, washer 41, anchor 47 and part 48.

The present description clearly shows the possibilities of applying this invention to the securing of standard nuts and screws through rotations of a fraction of a degree.

The invention as described and illustrated may be clearly understood and no further explanations will be required by those versed in the matter.

As the invention herein specified has been described and illustrated in the manner of a preferred embodiment which is to be considered as an illustrative example only and in no ways a limitation upon the invention, same may be subjected to changes in construction and details without thereby departing from its essential nature, as clearly defined in the following claims.

We claim:

1. In an arrangement for locking a nut forming a regular polygon to its screw, the combination comprising a plate having a polygonal opening fitting the nut and also provided at its periphery with at least two sets of radial notches of equal width, the median notch lines of both sets being equidistantly spaced from their neighbors, the median notch lines of one set being arranged in a predetermined angular relation with respect to a sector of the polygon, the median notch lines of the other set being arranged in a predetermined different angular relation with respect to another sector of the polygon, and also comprising a fixed washer with a hole for a screw and at least two sets of radial tongues of equal width and fitting the notches, the number of tongues in each set being a fraction of the number of notches in a set, the spacing of the tongue sets from one another and of the tongues within a tongue set being such as to cause in a given position of the washer only one of the tongues to register with a notch in the plate and to cause the remaining tongues of the sets to miss registration with a notch succeeding the first notch by an angle increasing uniformly and in succession.

2. The combination according to claim 4 and wherein the polygon is a hexagon and the relation of the first set to the first sector is such as to cause each of the outer median lines of the first set to coincide with one of the radii of the sector and the relation of the second set to the second sector is such as to displace each of the outer median lines of the second set with respect to one of the radii of the second sector by an angle which is a fraction of the angle of spacing between adjacent notch median lines and the spacing of the tongue sets and of the tongues within a set is such that the angle by which the remaining tongues miss registry with a notch is a progressive multiple of a fraction of the angle by which each of the outer median lines of the second notch set is displaced with respect to one of the radii of the second notch set.

3. The combination according to claim 5 and wherein the notches in a set number four and the tongues in a set number two.

4. In a device for locking a nut forming a regular polygon to its screw, the combination, comprising, a plate having a polygonal opening fitting the nut and also provided at its periphery with at least two pairs of notches of equal width, the median notch lines of both pairs being equidistantly spaced from the other pair, the median notch lines of one pair being arranged in a predetermined angular relation with respect to a sector of the polygon, the median notch lines of the other pair being arranged in a predetermined different angular relation with respect to another sector of the polygon, and also comprising a fixed washer with a hole for receiving the shank of the screw and at least two sets of tongues of equal width and fitting the notches, the number of tongues in each set being a fraction of the number of notches in a pair, the spacing of the tongues within a tongue set differing from the spacing of the notches within a notch pair.

FRIEDRICH PISCHEK.
EDUARDO NICANDRO NAGLE.
ARTURO ZACARÍAS PAZ ANCHORENA.

REFERENCES CITED

The following references are of record in the file of this patent:

UNITED STATES PATENTS

| Number | Name | Date |
|---|---|---|
| 245,733 | Long | Aug. 16, 1881 |
| 767,642 | Hart | Aug. 16, 1904 |
| 822,989 | Schooley | June 12, 1906 |
| 998,905 | Jaques | July 25, 1911 |
| 1,371,134 | West | Mar. 8, 1921 |
| 1,707,933 | Gibbons | Apr. 2, 1929 |

FOREIGN PATENTS

| Number | Country | Date |
|---|---|---|
| 23,119 | Great Britain | Nov. 10, 1905 |